(12) United States Patent
Rainey

(10) Patent No.: US 9,669,857 B1
(45) Date of Patent: Jun. 6, 2017

(54) PROPULSION DEVICE FOR HAND-PUSHED EQUIPMENT

(71) Applicant: Randall D Rainey, Centre, AL (US)

(72) Inventor: Randall D Rainey, Centre, AL (US)

( * ) Notice: Subject to any disclaimer, the term of this patent is extended or adjusted under 35 U.S.C. 154(b) by 0 days.

(21) Appl. No.: 14/789,590

(22) Filed: Jul. 1, 2015

(51) Int. Cl.
  *B62B 5/00* (2006.01)
  *B62B 5/06* (2006.01)
  *B62B 3/00* (2006.01)

(52) U.S. Cl.
  CPC ............ *B62B 5/0026* (2013.01); *B62B 3/001* (2013.01); *B62B 5/06* (2013.01)

(58) Field of Classification Search
  CPC .............................. B62B 5/0026; B62B 3/001
  USPC .......................................................... 180/11
  See application file for complete search history.

(56) References Cited

U.S. PATENT DOCUMENTS

| | | |
|---|---|---|
| 2,867,449 A | 1/1959 | Shawver |
| 3,524,512 A | 8/1970 | Elton et al. |
| 3,575,250 A | 4/1971 | Dykes |
| 3,834,726 A | 9/1974 | Hobza |
| 3,876,024 A | 4/1975 | Shieman et al. |
| 4,096,920 A | 6/1978 | Heyn |
| 4,306,734 A * | 12/1981 | Swanson ................ B60D 1/32 188/112 A |
| 4,771,840 A | 9/1988 | Keller |
| 4,989,351 A | 2/1991 | Shear |
| 5,033,564 A | 7/1991 | Mattson |
| 5,064,012 A | 11/1991 | Losego et al. |
| 5,322,306 A * | 6/1994 | Coleman ............... B62B 3/1404 180/19.1 |
| 5,350,077 A | 9/1994 | Nezu et al. |
| 5,439,069 A | 8/1995 | Beeler |
| 5,573,078 A | 11/1996 | Stringer et al. |
| 5,718,534 A | 2/1998 | Neuling |
| 5,927,420 A | 7/1999 | Karrington |

(Continued)

FOREIGN PATENT DOCUMENTS

| | | |
|---|---|---|
| CA | 2277707 | 7/1999 |
| GB | 1230619 | 5/1971 |
| WO | 0166408 | 9/2001 |

OTHER PUBLICATIONS

Handtrucks2go "Outdoor Electric Platform Cart with Big Rugged Wheels" Dec. 29, 2014; pp. 1-4.

(Continued)

*Primary Examiner* — Joseph Rocca
*Assistant Examiner* — Michael Stabley
(74) *Attorney, Agent, or Firm* — Nicholas J. Landau; Michele P. Marron; Bradley Arant Boult Cummings LLP

(57) ABSTRACT

A propulsion unit is provided for propelling a piece of equipment that is normally intended to be pushed by a pedestrian. The unit involves a way to support an upright rider that is sized to allow the rider to reach a handle of the hand-pushed mobile equipment; a plurality of ways to contact the ground and allowing the way to support a rider to move across a surface in a low-friction manner; a way to provide thrust in one or both of the forward and backward directions; and a way to couple the unit to the hand-pushed mobile equipment and allow the hand-pushed mobile equipment to yaw relative to the unit around a vertical axis that is approximately collinear with the vertical axis of the upright rider.

24 Claims, 7 Drawing Sheets

(56) References Cited

U.S. PATENT DOCUMENTS

| | | | |
|---|---|---|---|
| 5,947,637 A * | 9/1999 | Neuling | B62D 53/02 239/150 |
| 6,220,379 B1 | 4/2001 | Schugt et al. | |
| 6,244,366 B1 * | 6/2001 | Otterson | B62B 3/1404 180/11 |
| 6,276,471 B1 | 8/2001 | Kratzenberg et al. | |
| 6,343,665 B1 | 2/2002 | Eberlein et al. | |
| 6,443,252 B1 | 9/2002 | Andes | |
| 6,494,542 B1 * | 12/2002 | Watt | B24B 7/188 280/503 |
| 6,572,122 B2 | 6/2003 | Johnson et al. | |
| 6,575,819 B2 * | 6/2003 | Beyersdorff | B24B 7/188 125/13.01 |
| 6,637,760 B1 * | 10/2003 | Carman | A01D 34/001 280/32.7 |
| 6,702,313 B2 | 3/2004 | Forshee et al. | |
| 6,725,955 B2 | 4/2004 | Bidwell | |
| 6,969,079 B2 * | 11/2005 | Kamen | B62D 61/00 180/218 |
| 6,986,397 B2 | 1/2006 | Mattson et al. | |
| 7,093,841 B2 | 8/2006 | Conrad | |
| 7,108,090 B2 | 9/2006 | Turner | |
| 7,219,754 B2 | 5/2007 | Johnson | |
| 7,300,061 B1 | 11/2007 | Omstead | |
| 7,395,886 B2 * | 7/2008 | Berg | A47F 10/04 180/19.2 |
| 7,549,651 B2 | 6/2009 | Holtan et al. | |
| 7,591,509 B2 | 9/2009 | Almy | |
| 7,699,128 B1 | 4/2010 | Strauss | |
| 7,699,130 B2 | 4/2010 | Palmer | |
| 7,722,058 B2 | 5/2010 | Giampavolo | |
| 8,573,625 B2 | 11/2013 | Gramme | |
| 8,684,373 B2 * | 4/2014 | Holtan | B62B 3/1404 280/33.991 |
| 8,720,615 B2 | 5/2014 | Wanger et al. | |
| 8,870,209 B2 * | 10/2014 | Conrad | B60D 1/167 280/250.1 |
| 8,894,086 B2 | 11/2014 | Ekbote | |
| 9,308,790 B1 * | 4/2016 | Sharp | B60D 1/167 |
| 2007/0131465 A1 | 6/2007 | Garceau | |
| 2008/0041644 A1 | 2/2008 | Tudek et al. | |
| 2011/0121541 A1 | 5/2011 | Yamano et al. | |

OTHER PUBLICATIONS

Spacepac Industries Pty. Ltd. "Spacepac Mule—450" May 16, 2012; p. 1.

* cited by examiner

PROPULSION DEVICE FOR HAND-PUSHED EQUIPMENT

BACKGROUND

A. Field of the Disclosure

The present disclosure relates generally to powered vehicles.

B. Background

Hand-pushed equipment is used for a wide variety of purposes. Generally speaking such hand-pushed equipment involves a carrier or other device with one or more mobile bearings (such as wheels, skids, rollers, or skis) and a handle system that allows a walking person to grip the equipment using his or her hands. The front mobile bearing or bearings allow the equipment to move in an arc of directions, either by swiveling or some other means; specific examples of such other means include having a single front wheel (such as on a wheelbarrow), one or more caster wheels, or one or more roller balls. This amounts to a simple steering mechanism, which allows the pusher to turn the equipment by exerting uneven force on the right and left sides of the equipment with his hands.

Examples of such hand-pushed equipment include a shopping cart, a wheelchair, a wheelbarrow, a luggage cart, a stroller, a hand truck, a sled, and a lawn mower. A more exotic example would be a hover-mower, which, although lacking the mobile bearings that are commonly used in other types of pushed devices, turns easily when a user exerts uneven force on the handle, as it is supported by an air cushion.

A serious limitation of such pushed equipment is that the user must be strong enough to walk and push the equipment with his arms for a sustained period of time. Disabled and elderly people thus cannot use them. As the population ages and becomes increasingly obese, this problem will almost certainly become more pronounced.

Solutions have been proposed to this problem, but so far with limited success. The most common solution has been to convert the pushed equipment itself into a powered vehicle. Typically this involves adding an integral seat and engine to the equipment. It increases the cost, weight, space, and energy required to move the equipment. Such vehicles must be specially purchased, and generally cannot be simply added to existing pushed devices. One common example is the riding shopping cart. Riding shopping carts must be purchased in addition to a store's normal stock of shopping carts, and will of course remain idle until a person unable to use a manual shopping cart requires them. The storage basket of a riding shopping cart must be very small, because the sitting rider has a shorter reach than he would while standing. The sitting rider faces challenges in reaching items on higher shelves; the rider may be unable to rise to reach such items, or may endure undue stress in doing so.

SUMMARY

The problems in the art identified above, as well as others, have been addressed by a propulsion unit provided in this disclosure. It is of course to be understood that not every embodiment of the propulsion unit will address such problems, nor will every embodiment of the unit address all such problems.

A first general embodiment of the propulsion unit comprises: support means for supporting an upright rider and sized to allow the rider to reach a handle of the hand-pushed mobile equipment; a plurality of bearing means for contacting the ground and allowing the means for supporting a rider to move across a surface in a low-friction manner; thrust means for providing thrust in one or both of the forward and backward directions; and coupling means for coupling the unit to the hand-pushed mobile equipment and allowing the hand-pushed mobile equipment to yaw relative to the unit around a vertical axis that is approximately collinear with the vertical axis of the upright rider.

A second general embodiment of the propulsion unit comprises: (a) a support platform configured to accommodate an upright rider and capable of supporting the weight of said rider; (b) a plurality of wheels, each having a ground contact point, at least three of said wheels being load-bearing, and at least one of said wheels being a first drive wheel, wherein the ground contact points of the three load-bearing wheels define a plane; (c) a drive motor positioned to drive the first drive wheel; and (d) a connector to connect the propulsion unit to the hand-pushed mobile equipment by forming a yaw joint, wherein the joint swivels about a swivel point below the platform along a swivel axis, enabling the hand-pushed mobile equipment to yaw relative to the propulsion unit when connected; wherein the unit is caused to steer when connected to the hand-pushed mobile equipment via the joint when the rider exerts uneven force on the hand-pushed mobile equipment on opposite sides of the direction of thrust.

An assembly of a propulsion unit and a shopping cart is also provided, comprising: any of the propulsion units above; a shopping cart comprising (i) a handle having an inboard region and two outboard ends, and (ii) a lower rear crossbar; an adaptor connected to the connector of the propulsion unit and reversibly fastened to the lower rear crossbar of the shopping cart; and a control interface of the propulsion unit placed on an outboard end of the handle.

The above summary presents a simplified description in order to provide a basic understanding of some aspects of the claimed subject matter. The summary is not an extensive overview. It is not intended to identify key or critical elements or to delineate the scope of the claimed subject matter. Its sole purpose is to present some concepts in a simplified form as a prelude to the more detailed description that is presented later.

BRIEF DESCRIPTION OF THE DRAWINGS

FIG. 6(A) shows a rider steering the unit to the left, and FIG. 6(B) shows the rider steering the unit to the right. Note that the rider is able to steer the unit merely by rotating his torso, and is not required to lean or alter the position of his feet.

DETAILED DESCRIPTION

A. Definitions

Figure 1:
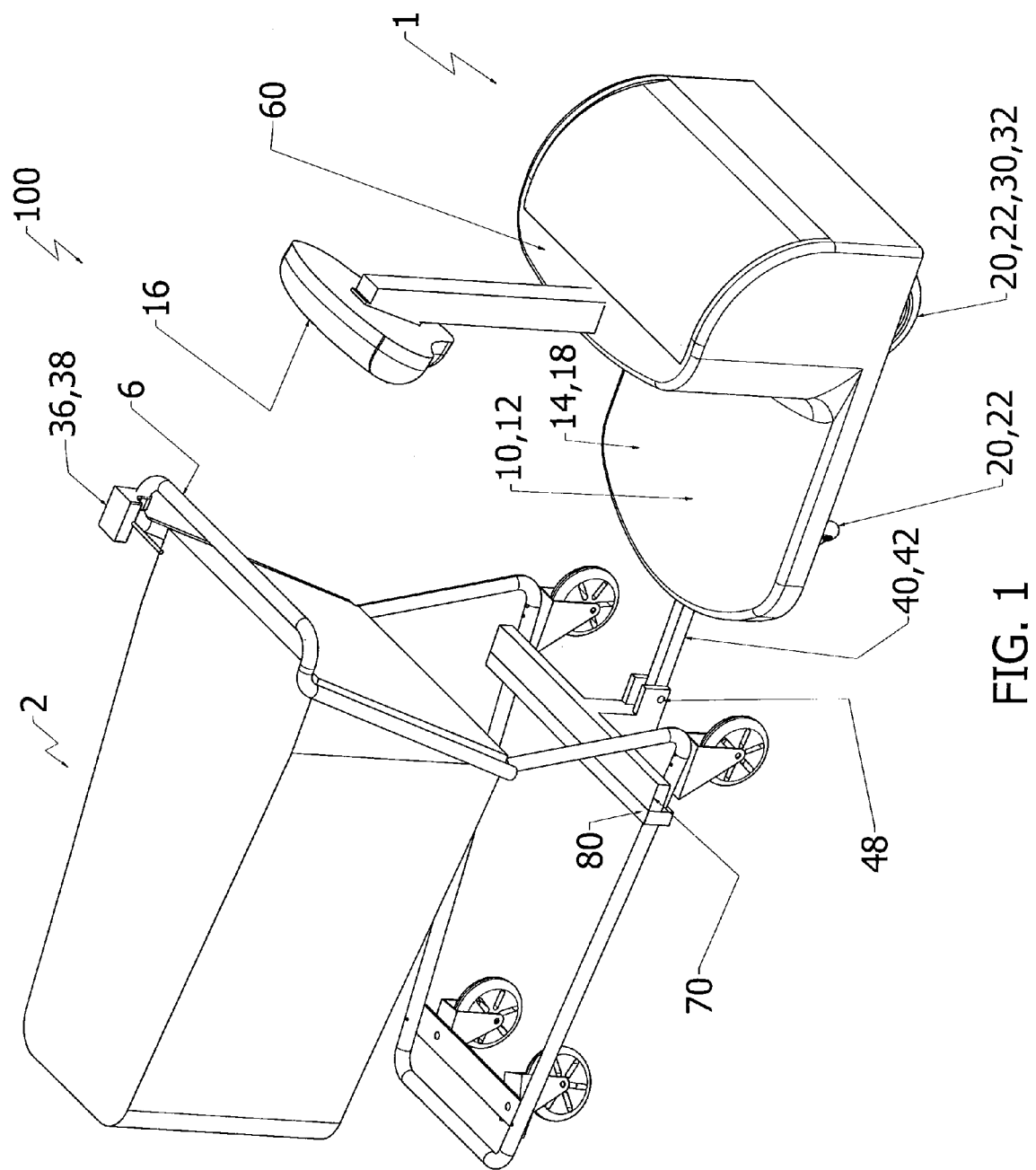
FIG. 1: A perspective view of an assembly of an embodiment of the propulsion unit and a shopping cart (see FIG. 7 for a detailed view of area "A").
Figure 2:
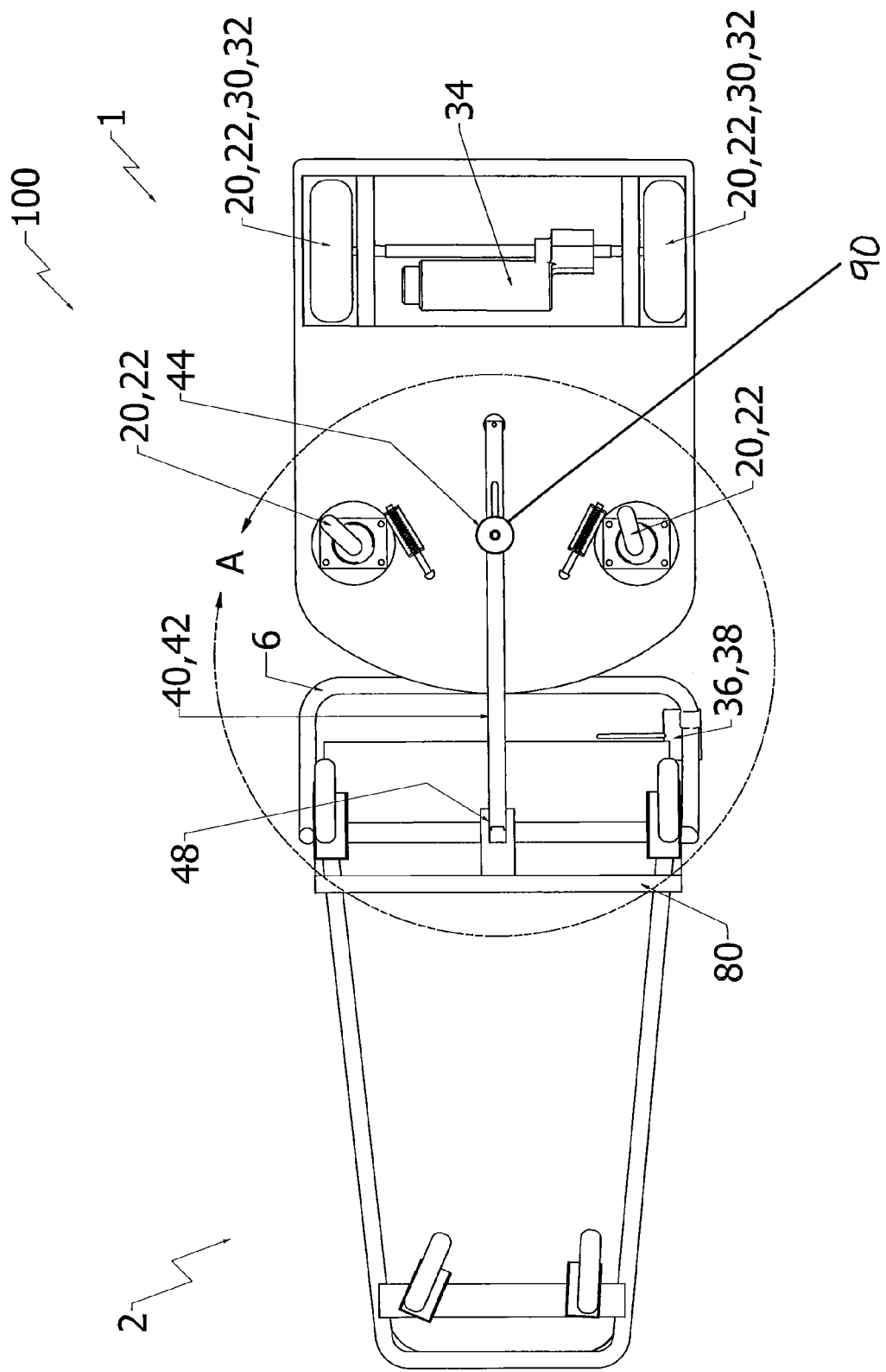
FIG. 2: A bottom view of the assembly shown in FIG. 1.
Figure 3:
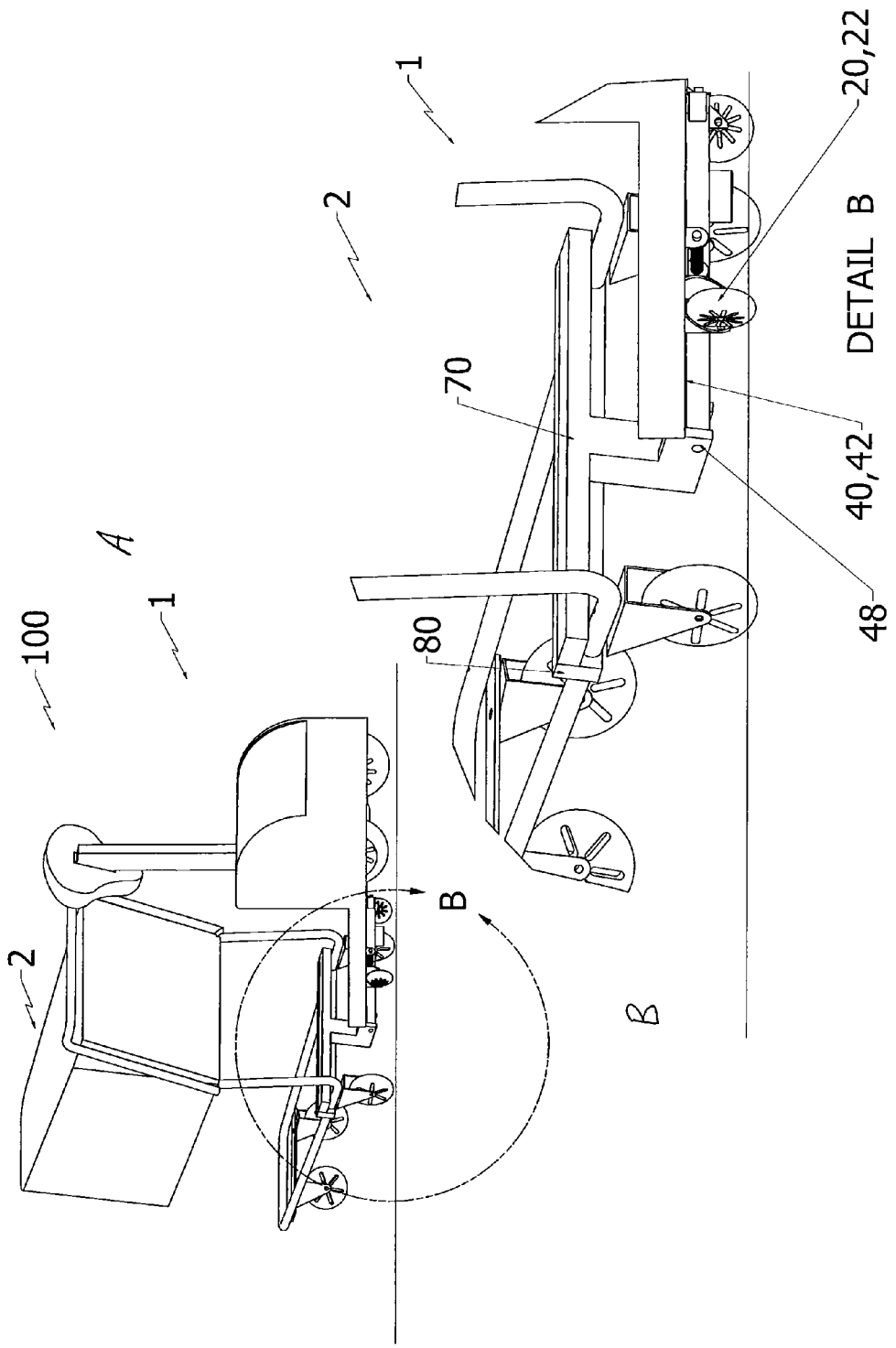
FIG. 3: (A) A perspective view of the assembly shown in FIG. 1 in which the shopping cart is pitched compared to the propulsion unit 1. (B) An enlarged view of area "B" in FIG. 3(A), showing detail of the pitch joint.
Figure 4:
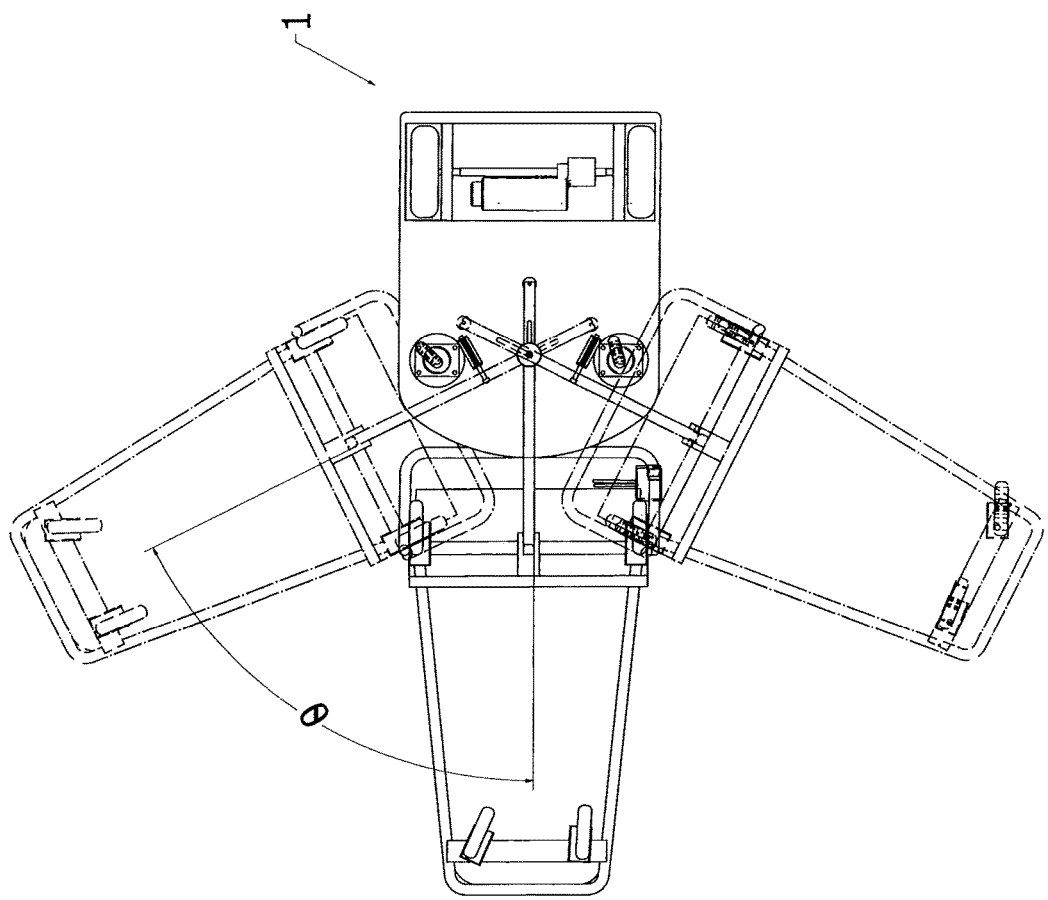
FIG. 4: A bottom view of the assembly shown in FIG. 1, illustrating three possible yaw positions of the shopping cart relative to the propulsion unit. Note the swivel point of the yaw joint under the platform. The angle of yaw is shown as θ.
Figure 5:
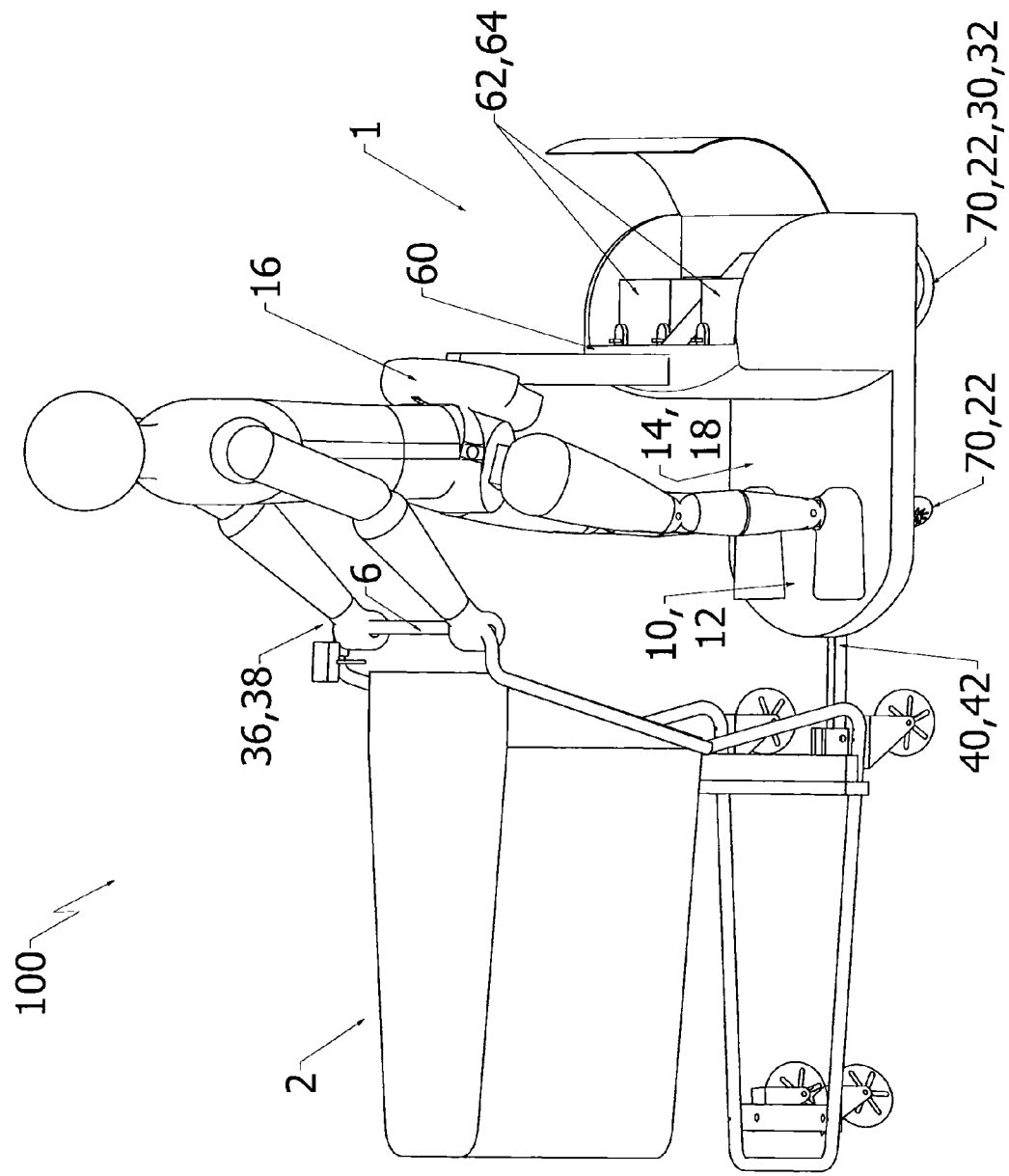
FIG. 5: A perspective view of the assembly shown in FIG. 1, revealing the inside of the drive section, which holds the battery power source for the drive motor.

Unless otherwise defined, all terms (including technical and scientific terms) used herein have the same meaning as commonly understood by one of ordinary skill in the art of this disclosure. It will be further understood that terms, such as those defined in commonly used dictionaries, should be interpreted as having a meaning that is consistent with their meaning in the context of the specification and should not be interpreted in an idealized or overly formal sense unless expressly so defined herein. Well known functions or constructions may not be described in detail for brevity or clarity.

It will be understood that when a feature or element is referred to as being "on" another feature or element, it can be directly on the other feature or element or intervening features and/or elements may also be present. In contrast, when a feature or element is referred to as being "directly on" another feature or element, there are no intervening features or elements present. It will also be understood that, when a feature or element is referred to as being "connected", "attached" or "coupled" to another feature or element, it can be directly connected, attached or coupled to the other feature or element or intervening features or elements may be present. In contrast, when a feature or element is referred to as being "directly connected", "directly attached" or "directly coupled" to another feature or element, there are no intervening features or elements present. Although described or shown with respect to one embodiment, the features and elements so described or shown can apply to other embodiments.

The terminology used herein is for the purpose of describing particular embodiments only and is not intended to be limiting. As used herein, the singular forms "a", "an" and "the" are intended to include the plural forms as well, unless the context clearly indicates otherwise.

Spatially relative terms, such as "under", "below", "lower", "over", "upper" and the like, may be used herein for ease of description to describe one element or feature's relationship to another when the propulsion unit is positioned for normal operation (i.e., right side up).

The terms "first" and "second" are used herein to describe various features or elements, but these features or elements should not be limited by these terms. These terms are only used to distinguish one feature or element from another feature or element. Thus, a first feature or element discussed below could be termed a second feature or element, and similarly, a second feature or element discussed below could be termed a first feature or element without departing from the teachings of the present disclosure.

With reference to the use of the words "comprise" or "comprises" or "comprising" in the foregoing description and/or in the following claims, unless the context requires otherwise, those words are used on the basis and clear understanding that they are to be interpreted inclusively, rather than exclusively, and that each of those words is to be so interpreted in construing the foregoing description and the following claims.

The term "consisting essentially of" means that, in addition to the recited elements, what is claimed may also contain other elements (steps, structures, ingredients, components, etc.) that do not adversely affect the operability of what is claimed for its intended purpose as stated in this disclosure. Importantly, this term excludes such other elements that adversely affect the operability of what is claimed for its intended purpose as stated in this disclosure, even if such other elements might enhance the operability of what is claimed for some other purpose.

The terms "about" or "approximately" mean within a range of reasonable error around a central value. Such reasonable error may for example stem from the precision of an instrument or method used to measure the value. The error could also stem from the precision of a method of making a component of a device. Specific examples of such limits of reasonable error are 20%, 10%, 5%, 2.5%, and 1%. Unless specified otherwise, all numerical values may be approximate.

B. Propulsion Unit

A propulsion unit 1 for hand-pushed mobile equipment 2 is provided. The unit 1 generally comprises support means 10 for supporting an upright rider and sized to allow the rider to reach a handle 6 of the hand-pushed mobile equipment 2; a plurality of bearing means 20 for contacting the ground and allowing the means for supporting a rider 10 to move across a surface in a low-friction manner; thrust means 30 for providing thrust in one or both of the forward and backward directions; and coupling means 40 for coupling the unit 1 to the hand-pushed mobile equipment 2 and allowing the hand-pushed mobile equipment 2 to yaw relative to the unit 1 around a vertical axis 52 that is approximately collinear with the vertical axis 54 of the upright rider.

In a general embodiment, the unit 1 comprises a support platform 12 configured to accommodate an upright rider and capable of supporting the weight of said rider; a plurality of wheels 21, each having a ground contact point 110, at least two of said wheels 21 being load-bearing 22, and at least one of said wheels 21 being a first drive wheel 32; a drive motor 34 positioned to drive the first drive wheel 32; and a connector 42 to connect the propulsion unit 1 to the hand-pushed mobile equipment 2 by forming a yaw joint 44, wherein the joint swivels about a swivel point 46 below the platform 12 along a swivel axis 52, enabling the hand-pushed mobile equipment 2 to yaw relative to the propulsion unit 1 when connected; wherein the unit 1 is caused to steer when connected to the hand-pushed mobile equipment 2 via the joint 44 when the rider exerts uneven force on the hand-pushed mobile equipment 2 on opposite sides of the direction of thrust.

The hand-pushed mobile equipment 2 may be any moveable device that is intended to be pushed by a pedestrian and steered by the application of uneven force by the pedestrian's hands on the left and right sides of the device. Specific non-limiting examples of the equipment 2 include a shopping cart 4, a wheelchair, a wheelbarrow, a luggage cart, a stroller, a hand truck, a sledge, and a lawn mower. Some embodiments of the unit 1 are configured to push a piece of equipment 2 capable of use on uneven surfaces (such as a lawn mower or a wheelbarrow). Some embodiments of the unit 1 are configured to push a piece of equipment 2 intended for use on relatively even and level surfaces. In a particular embodiment the equipment 2 is a shopping cart 4.

The support means 10 may be a support platform 12 or any structure equivalent thereto. The support platform 12 has an area on which the rider stands or leans 14. This may be as simple as a flat and level surface. In some embodiments the rider simply stands on the platform 12; such embodiments may comprise a standee area 14 that is relatively flat and large enough for a typical rider's feet. A leaning structure, such as a standing seat 16, may also be present. Such embodiments may comprise another structure for the feet 18, such as a gently inclined space to allow the rider to brace his legs. The support platform 12 may also comprise a section to accommodate the rider's feet 18 to allow the rider to mount and dismount the platform 12. The section 18 may take the form of a step in some embodiments. The section 18 may simply be the standee area 14 described above. The upper surface of this section 18 may be of a controlled height. A low height has the advantage of easy mounting and dismounting for feeble or disabled riders. A greater height has the advantage of accommodating more structures below the rider and allows the rider to reach elevated areas such as shelves. Accommodating an upright rider has the advantage of allowing the rider greater reach than would be allowed if the rider were sitting; whereas a sitting rider cannot easily reach most of the basket of a shopping cart 4 or the tray of a wheelbarrow, and an upright rider can.

The plurality of bearing means 20 for contacting the ground and allowing the means for supporting a rider 10 to move across a surface in a low-friction manner may be any such load bearing means 20 known, including wheels 21, skids, rollers, skis, or any equivalent thereof. In some embodiments of the unit 1 the bearing means 20 are load bearing wheels 22. The load-bearing wheels 22 may be any type of wheels 21 known in the art to be suitable for supporting a human rider at a relatively modest speed. In some embodiments of the unit 1 the load bearing wheels 22 are capable of supporting the rider at about walking speed, for example about 1-3 miles per hour (1.6-4.8 km hr$^{-1}$). Although the load bearing wheels 22 may be engineered to handle greater speed, wheels 21 engineered for no more than about 3 miles per hour (4.8 km hr$^{-1}$) have the advantage of being less bulky than more durable wheels 21. The weight of the human rider to be supported will depend at least partially on the purpose of the equipment 2 that is pushed. For example, if the unit 1 propels a general purpose shopping cart 4, the load bearing wheels 22 will be configured to bear the weight of a large (potentially obese) adult. In a specific embodiment the load bearing wheels 22 are capable of supporting a 500 lb (227 kg) rider. It is to be understood that the number and positioning of the load bearing wheels 22 will affect the required tolerances of any single wheel 21 for any given design requirement. In some versions of the unit 1 the load bearing wheel 22 is not a drive wheel 32.

In some embodiments of the unit 1 one or more of the load bearing wheels 22 are free to swivel. For example, the wheels 21 may be able to swivel over an arc of directions (or in any direction). In further embodiments of the unit 1, the wheels 21 may roll in any direction. Examples of such swiveling wheels 21 include caster wheels 24. Another example of a wheel 21 that is free to roll in any direction is a roller ball bearing. Wheels 21 that are free to roll in any direction have the advantage of allowing the unit 1 to change direction easily. A specific embodiment of the unit 1 comprises at least four load bearing wheels 22 in a rectangular arrangement on the underside of the platform 12, comprising two rear 28 load bearing wheels 22 that do not swivel and comprising two front 26 load bearing wheels 22 that are free to roll in any direction.

Some embodiments of the unit 1 comprise at least three load-bearing wheels 22, wherein the ground contact points 110 of the three load-bearing wheels 22 define a plane. In such embodiments, because all three wheels 21 are by definition not mutually coaxial, the wheels 21 provide stability in two dimensions. In such embodiments it is to be understood that the ground contact points 110, in addition to defining a plane, will define a triangle large enough in both dimensions to provide significant stability to the platform 12. If the triangle thus defined is too narrow in a given dimension the platform 12 will lack stability. The necessary dimensions of the triangle thus defined will vary greatly depending on the shape, size, and weight of the device, but can be designed by one of ordinary skill in the art without undue experimentation. This arrangement has the advantage of providing stability to the rider along the forward-backward axis. Arrangements comprising two coaxial load bearing wheels 22 have the advantage of decreased weight and increased maneuverability.

The thrust means 30 will be any suitable structure for imparting thrust to the unit 1. The thrust means 30 may be, for example, a drive wheel 32. However, the thrust means 30 may in some cases be another structure, such as a drive screw, track, fan, propeller, rocket, cog, or an equivalent thereof. In some embodiments of the unit 1 the drive wheel 32 is one of the load-bearing wheels 22. In other embodiments the drive wheel 32 is not load-bearing. In various arrangements all, some, or none of the load-bearing wheels 22 may be drive wheels 32; and all, some, or one of the drive wheels 32 may be load-bearing 22. A specific embodiment of the unit 1 comprises four load-bearing wheels 22, two of which are drive wheels 32. In a further specific embodiment of the unit 1, the unit 1 comprises four wheels 21, in which two of the wheels 21 are load-bearing 22 and swivel (or in some embodiments are free to roll in any direction), and in which two of the wheels 21 are load-bearing drive wheels 32 that do not swivel. In yet a further specific embodiment, the plurality of wheels 21 comprises four wheels 21 in a generally symmetrical quadrilateral arrangement (e.g., rectangular or trapezoidal), two of said wheels 21 being rear wheels 28 and two of said wheels 21 being front wheels 26, in which the front wheels 26 are load bearing 22 and free to roll in any direction, and in which the rear wheels 28 are drive wheels 32 that are load bearing 22 and do not swivel. A load bearing drive wheel 32 has the advantage of providing additional support to the platform 12. A non-load bearing drive wheel 32 has the advantages of requiring less weight, requiring less space, and being less expensive. If the drive wheel 32 is located below the rider, a non-load bearing drive wheel 32 will allow a lower platform 12 to be used, as it requires less space under the platform 12. If the drive wheel 32 is not needed to bear the rider's weight, it may be placed in a wider variety of locations on the unit 1.

In some embodiments of the unit 1 the drive wheel 32 is located approximately centrally in the right-left direction. This configuration has the advantage that the drive wheel 32 will remain in contact with the ground, even if the unit 1 leans (rolls) to the left or right. In some embodiments of the unit 1, the drive wheel 32 is positioned such that the drive wheel 32 and platform's 12 center of gravity form a line that is approximately parallel to the direction of thrust. This has the advantage that the drive wheel 32 will remain in contact with the ground, even if the unit 1 leans to the left or right, and will remain roughly along the line of the center of gravity to provide balance. The term "approximately parallel" in this context should be construed to include a line that is not exactly parallel to the direction of thrust within a certain range of tolerance, but sufficiently parallel that the mass of the unit 1 is about evenly distributed on either side of the drive wheel 32. In some embodiments of the drive wheel 32, the drive wheel 32 and platform's 12 center of gravity form a line that is within 5° of parallel to the direction of thrust.

Some embodiments of the drive wheel 32 do not change direction relative to the rest of the unit 1. Stated another way, some embodiments of the drive wheel 32 are configured to maintain a plane of rotation that is essentially constant relative to the rest of the unit 1. The term "essentially constant" should be construed to mean that the plane of rotation may vary to a small degree that makes no significant change in the unit's heading. In such embodiments the drive wheel 32 may have a certain amount of "give" to prevent damage when bumps, cracks, or other irregularities are encountered on the ground; in such embodiments the plane of rotation is still essentially constant.

The drive motor 34 may be any known in the art. Suitable examples include an electric motor and an internal combustion engine. Particularly suitable internal combustion versions include a two-stroke gasoline engine and a propane engine. Internal combustion engines have the advantages of high maximum power and compact fuel storage. Electric motors have the advantages of low noise, low maintenance, no emissions, and lower fuel cost. Electric motors can also be provided in direct-drive configurations. The drive motor 34 may provide direct-drive power to the thrust means 30 or drive wheel 32, or it may provide the power by way of a drive train. In some embodiments of the unit 1 the drive motor 34 provides power by way of a transaxle.

The coupling means 40 may be any known to be suitable in the art, for example a connector 42 to connect the propulsion unit 1 to the hand-pushed mobile equipment 2 by forming a yaw joint 44, wherein the joint swivels about a swivel point 46 below the platform 12 along a swivel axis 52, enabling the hand-pushed mobile equipment 2 to yaw relative to the propulsion unit 1 when connected. The ability of the equipment 2 to yaw relative to the propulsion unit 1 is critical to the functioning of the unit 1. It has been found that the equipment 2 itself can serve as the steering mechanism for the engaged propulsion unit 1 and equipment 2 if they are connected in such a way as to allow yaw. The rider of the unit 1 need only exert uneven force on the right and left sides of the equipment 2, which results in the equipment 2 turning as it would if pushed by a walker. The propulsion unit 1 will then turn in the same direction as the equipment 2 until the two are again aligned. This does not occur if the propulsion unit 1 and the pushed equipment 2 are not free to yaw relative to one another. This allows the propulsion unit 1 to be constructed without a complex steering mechanism, and indeed some embodiments of the unit 1 have no additional steering mechanism.

The location of the yawing swivel point 46 below the platform 12 has significant advantages over configurations in which the swivel point 46 is forward of the platform 12. During attempts to design a propulsion unit 1 for hand-pushed mobile equipment 2 suitable for an upright rider of reduced physical abilities, it was discovered that any system that uses the hand-pushed mobile equipment 2 as the steering mechanism poses challenges to disabled people. Typically riding units to accompany hand-steered equipment 2, whether self-propelled or towed, have a yawing pivot point 46 that is at the rear end of the pushed equipment 2, requiring that the operator extend his arms forward and hold the equipment 2 approximately an arm's length in front of himself. As a result, if the operator steers the equipment 2 by exerting uneven force on the right and left sides of the handle(s) 6, the operator must lean forward to extend one arm, while pulling the other arm toward himself. If the operator is walking while pushing the equipment 2, he barely notices the need to lean forward, because he is already leaning forward to provide forward force to the equipment 2. However, if the operator is standing upright on a riding unit 1, the need to lean forward requires that the operator brace himself against the handles 6 of the equipment 2 to prevent a fall. While this is merely awkward for the able-bodied, it is dangerous to anyone who lacks the upper body strength to support himself in such a manner.

In some embodiments of the unit 1, the platform 12 has a section to accommodate the rider's feet 18, and the first swivel point 46 is directly below the section to accommodate the rider's feet 18. In further embodiments of the unit 1, the yaw joint 44 is positioned so that the swivel point 46 is directly below the upright rider when the upright rider is on the support platform 12. In still further embodiments, the yaw joint 44 is positioned so that the swivel axis 52 of the yaw joint 44 is approximately collinear with the vertical axis 54 of the rider's body when the rider is on the support platform 12. In such embodiments, the swivel axis 52 is said to be approximately collinear when the vertical axis of the joint is proximate to the rider's body when the rider is on the support platform 12; for example within approximately 12" (30 cm), within approximately 6" (15 cm), within approximately 3" (7.6 cm), or within approximately 1" (2.5 cm). In a specific embodiment of the unit 1 the swivel axis 52 of the yaw joint 44 is exactly collinear with the vertical axis 54 of the rider's body.

In some embodiments of the unit 1, the connector 42 restricts the hand-pushed mobile equipment 2 from pitching and rolling relative to the propulsion unit 1. Some embodiments of the connector 42 form a pitch joint 48, wherein the pitch joint 48 swivels about a second swivel point 50 forward of the platform 12, enabling the hand-pushed mobile equipment 2 to pitch relative to the propulsion unit 1 when connected. In further embodiments, the second swivel point 50 is forward of the unit 1. The advantages of a connector 42 that allows the propulsion unit 1 to pitch relative to the hand-pushed equipment 2 are clear, mainly in that it allows the unit 1 to push the equipment 2 up and down ramps or over other uneven surfaces. However, the configuration of the connector 42 that places the yawing swivel point 46 under the platform 12 introduces a constraint on design. If the yawing swivel point 46 and the pitching swivel point 50 are at the same point (as in a universal joint), space must be provided in the platform 12 above the connector 42 if the pushed equipment 2 is to be upwardly inclined relative to the propulsion unit 1. Placing the second (pitching) swivel point 50 forward of the platform 12 has the advantage of allowing the hand-pushed equipment 2 to pitch relative to the propulsion unit 1 without the connector 42 being limited by the vertical clearance of the platform 12.

Some embodiments of the connector 42 are of adjustable length. Such embodiments of the connector 42 have the advantage of being able to accommodate riders of varying sizes and specifically with varying arm spans. Some such embodiments of the connector 42 may be capable of being locked at a fixed length and also unlocked such that the length can be changed. For example, the connector 42 may comprise a groove that accommodates a pin at the first yawing pivot point, allowing the connector 42 to slide a defined distance relative to the first pivot point. In a more specific embodiment, the pin is threaded, and a nut or equivalent structure is used to reversibly tighten the pin against the connector 42 to arrest sliding. In some embodiments of the connector 42 of adjustable length the length of the connector 42 is not locked during operation; instead the connector 42 has a certain degree of "play" in terms of its length, to allow the operator to hold the hand-pushed equipment 2 in different positions comfortably.

The connector 42 may comprise a brake 90. The brake 90 may be any suitable brake 90 known in the art, such as an electric brake. Some embodiments of the connector 42 comprise a pivot brake, which refers to a brake 90 positioned to lock the relative yaw between the propulsion unit 1 and the hand-pushed equipment 2. Such a pivot brake 90 may be configured to activate when the propulsion unit 1 stops, to allow the operator to safely mount and dismount the unit 1 without the possibility that the unit 1 might shift. Some embodiments of the connector 42 comprise a slide brake, which refers to a brake 90 positioned to lock the length of the connector 42 (in those embodiments in which the length of the connector 42 is otherwise variable). The slide brake may also be configured to activate when the propulsion unit 1 stops. In further embodiments, either of the brakes 90 may be configured to activate in response to a signal from a dead man's switch.

The unit 1 may comprise a drive section 60 positioned adjacent to the platform 12, the drive section 60 comprising a drive component selected from the group consisting of: the drive motor 34, the drive wheel 32, and an energy source 66 providing energy to the drive motor 34. These drive components require a significant amount of space and are relatively heavy; locating them to a drive section 60 distinct from the platform 12 allows the platform to be lowered, because no space below the platform 12 is required for the drive components. In addition, the drive section 60 can have one or more load bearing wheels 22 below it to bear the weight of the components, reducing the number of load bearing wheels 22 needed below the platform 12. A particular embodiment of the drive section 60 is positioned forward or rearward of the platform 12; such an embodiment has the advantages of providing a central position to maintain the unit's 1 center of balance, and of providing a potential central location for the drive wheel 32 to prevent the unit 1 from pulling to one side or the other while operating.

Some embodiments of the unit 1 comprise an adaptor 70 configured to be fastened to the lower rear crossbar 80 of a shopping cart 4, and which is connected to the connector 42. The adaptor 70 may be fastened to the cart 4 by any suitable means known in the art. The adaptor 70 may be fastened by means of a fastener, including: a bolt, a strap and buckle, a cable tie, a captive fastener, a clamp, a clasp, a cleko, a clip, a pin and clutch, a hook-and-eye, a magnetic fastener, a latch, a nail, a peg, a PEM nut, a pin, a cotter pin, a circle cotter, a clevis fastener, a lynchpin, an R-clip, a split pin, a spring pin, a tapered pin, a retaining ring, a rivet, a screw, a screw anchor, a snap fastener, a strap, a nut, a threaded insert, a threaded rod, a tie, a toggle bolt, hook-and-loop material, a wedge anchor, and equivalents of any of the foregoing. The use of fasteners is well understood in the art, and one of ordinary skill could select a fastener for the adaptor 70 based on specific design needs. Some embodiments of the adaptor 70 will be configured to be reversibly fastened to the lower rear crossbar 80 of the shopping cart 4. Removable adaptors 70 have the advantage of allowing the unit 1 to be coupled to any available shopping cart 4 as needed, and removed as necessary to free up the shopping cart 4 for use by a walker. It also allows shopping carts 4 to be washed without exposing the propulsion unit 1 to the washing process, and allows the stock of shopping carts 4 to be replaced as they wear out without the need to replace the unit 1. In a specific embodiment the adaptor 70 is generally hemi-cylindrical and hollow, allowing it to be snapped over the crossbar 80. In the case of a shopping cart 4, the adaptor 70 may be designed with relatively modest strength, as the speed and mass of a shopping cart 4 in typical use are not particularly great.

The unit 1 may comprise a control interface 38 that is accessible to the hands of a rider while standing on the platform 12. The control interface 38 may be, for example a drive motor controller 36 and a user interface 38. This allows the rider to send commands to the drive motor 34 using hand controls such as buttons, dials, and joysticks. The drive controller 36 has the capability of activating and deactivating the drive motor 34. Some embodiments of the drive controller 36 have the capability of increasing or decreasing the output of the drive motor 34 to modulate speed or compensate for inclines. Further embodiments of the drive controller 36 have the capability to reverse the motor 34. A specific embodiment of the controller 36 provides the capability to provide slow acceleration; such an embodiment has the advantage of allowing smooth and safe acceleration from a stop to the unit's running speed, which prevents abrupt starts that could upset the balance of the operator. In a further specific embodiment, the controller 36 is configured to always limit the unit's acceleration to a maximum safe level, which can be determined by one of ordinary skill in the art.

A specific embodiment of the unit 1 comprises a drive motor controller 36, and a user interface 38 that is mountable on the handle 6 of the hand-pushed mobile equipment 2. This embodiment has the advantage of allowing the rider to control the drive motor 34 without removing his hands from the handle 6. Some embodiments of the controller 36 are configured to be placed on the outboard end 8 of a handle 6 of the pushed equipment 2. This allows the rider to control the drive motor 34 while maintaining a stabilizing wide grip on the handle 6. The wide grip provides better leverage for turning the equipment, in addition to superior stability. In a further specific embodiment the user interface comprises a dead man switch that is flipped if the rider stops gripping the handle 6.

An assembly 100 of a propulsion unit 1 and a shopping cart 4 is provided, comprising: any of the propulsions units 1 above; a shopping cart 4 comprising: (i) a handle 6 having an inboard region 9 and two outboard ends 8, and (ii) a lower rear crossbar 80; an adaptor 70 connected to the connector 42 of the propulsion unit 1 and reversibly fastened to the lower rear crossbar 80 of the shopping cart 4; and a control interface 38 of the propulsion unit 1 placed on an outboard end 8 of the handle 6.

C. Prophetic Example

Figure 6:
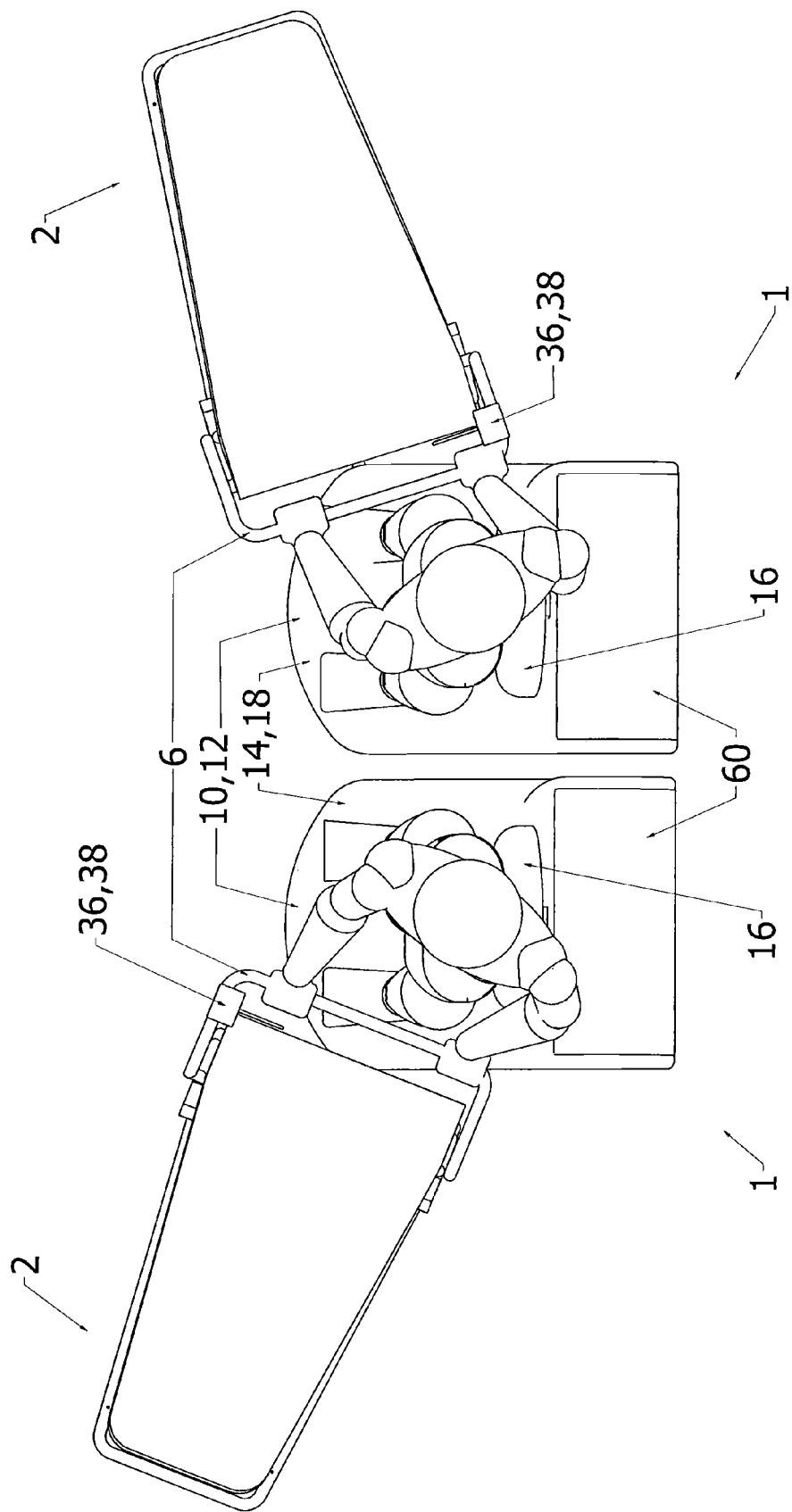
FIG. 6: A top view of the assembly shown in FIG. 1, illustrating the ergonomics of steering the unit.
Figure 7:
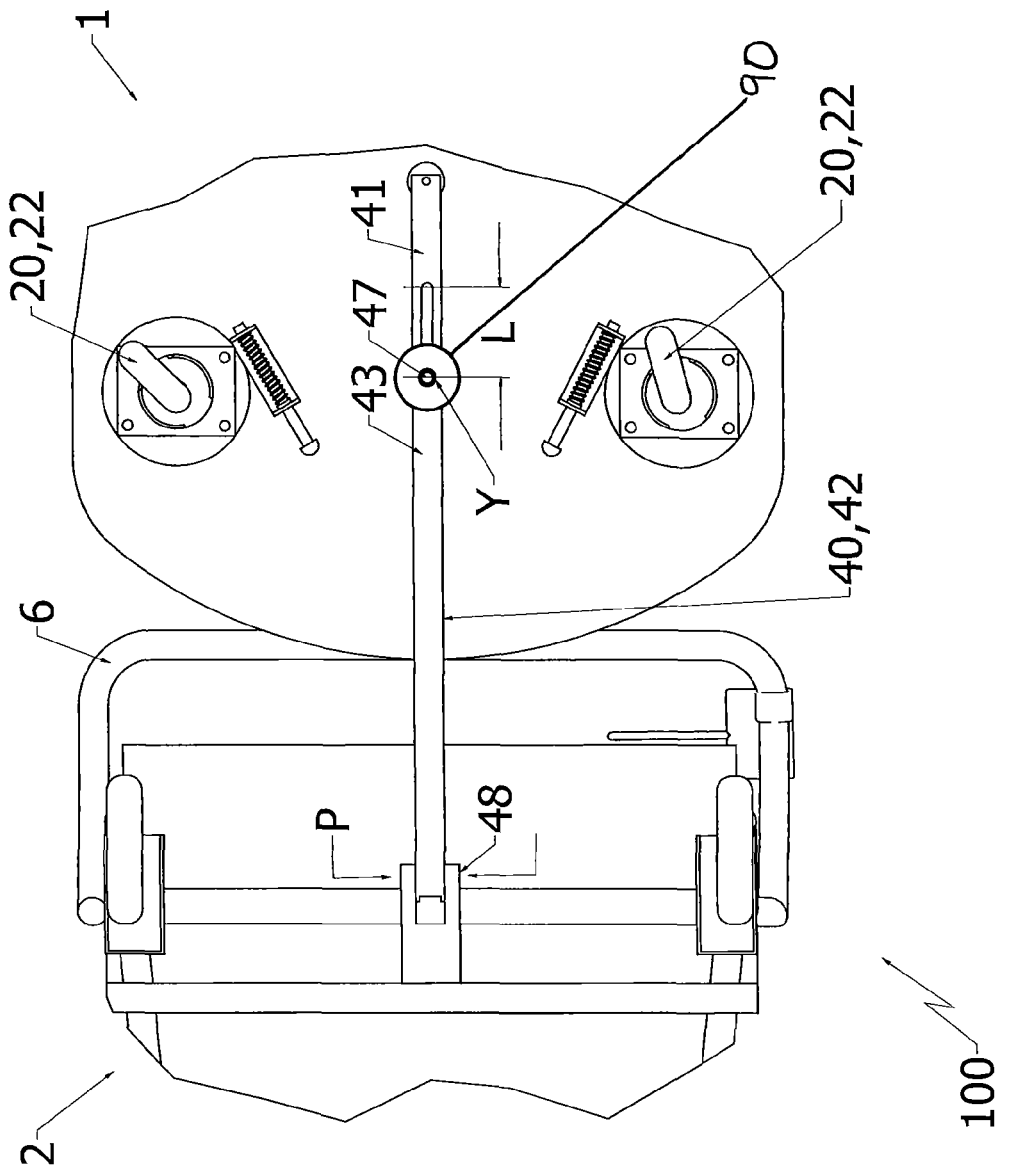
FIG. 7: Detail for region A in FIG. 2, illustrating the range of motion of the connector and joints. Note the spring-biased bolts positioned to prevent the relative yaw of the cart and unit from exceeding a maximum angle to avoid jackknifing. This figure shows the second swivel point of the pitch joint (P) and the first swivel point of the yaw joint (Y). Not that the location of the yaw joint can be adjusted along length (L) to accommodate the dimension of the rider.

A prophetic example is provided in FIGS. 1-7 of the drawings. As shown in those figures, the propulsion unit 1 is for a conventional shopping cart 4, and comprises a support platform 12 having an even flat surface and configured to accommodate an upright rider and capable of supporting the weight of said rider; four wheels 21 in a trapezoidal configuration when viewed from below, including two rear 28 load-bearing drive wheels 32 that do not swivel and two front 26 load-bearing non-drive wheels 21 that are swiveling caster wheels 24; a drive motor 34 positioned to drive the drive wheels 32; a connector 42 to connect the propulsion unit 1 to the hand-pushed mobile equipment 2 by forming a yaw joint 44 and a pitch joint 48. The yaw joint 44 has a yawing swivel axis 52 that is approximately collinear with the vertical axis 54 of the rider's body, enabling the hand-pushed mobile equipment 2 to yaw relative to the propulsion unit 1 when connected. The pitch joint 48 swivels about a second swivel point 50 forward of the unit 1, enabling the hand-pushed mobile equipment 2 to pitch relative to the propulsion unit 1 when connected. The unit 1 is caused to steer when connected to the hand-pushed mobile equipment 2 via the joint 44 when the rider exerts uneven force on the hand-pushed mobile equipment 2 on opposite sides of the direction of thrust. When coupled with the shopping cart 4, neither the cart 4 nor the propulsion unit 1 need any additional steering mechanism. A rear drive section 60 contains the drive motor 34 and batteries 64 as a power source 62. A standing seat 16 is positioned immediately behind the platform 12 to allow the rider to lean back during operation. A control interface 38 is on the right outboard end 8 on the shopping cart 4 handle 6, so that it can be easily manipulated by the rider while the rider's hands are in position on the handles 6. In this working example the control interface 38 communicates with the motor controller 36 via a wireless connection, but of course a wired connection could be used. Two spring-biased bolts are on the bottom of the unit 1, positioned to arrest the yawing of the shopping cart 4. If the yaw of the shopping cart 4 becomes too sharp, the connector 42 contacts one of the spring-biased bolts which exerts force against further yaw. If the rider continued to try to turn the shopping cart 4 the bolt will be pushed fully inside of the spring cylinder, and further yaw will not be possible. The spring-biased bolts increase resistances to yaw as the angle of yaw increases, "softening" the handling of the assembly. Furthermore, the spring-biased bolts aid the rider in returning the shopping cart to its original position (i.e., a position of no yaw relative to the propulsion unit). Note that the distance from the yawing pivot point 46 to the adaptor 70 on the cross-bar 80 of the shopping cart 4 can be adjusted to adapt to a rider of a specific arm span. As can be seen in FIG. 6, a rider can turn the shopping cart 4 over a broad arc merely by rotating his torso, and without leaning over or moving his feet. This enables a leaning rider to remain in a secure leaning position. As a result the unit 1 may be used by a rider with reduced upper body strength, while still allowing the rider to remain upright so as to reach items on the shelves and reach into the cart to deposit and remove items.

D. Conclusion

It is to be understood that any given elements of the disclosed embodiments of the invention may be embodied in a single structure, a single step, a single substance, or the like. Similarly, a given element of the disclosed embodiment may be embodied in multiple structures, steps, substances, or the like.

The foregoing description illustrates and describes the processes, machines, manufactures, compositions of matter, and other teachings of the present disclosure. Additionally, the disclosure shows and describes only certain embodiments of the processes, machines, manufactures, compositions of matter, and other teachings disclosed, but, as mentioned above, it is to be understood that the teachings of the present disclosure are capable of use in various other combinations, modifications, and environments and are capable of changes or modifications within the scope of the teachings as expressed herein, commensurate with the skill and/or knowledge of a person having ordinary skill in the relevant art. The embodiments described hereinabove are further intended to explain certain best modes known of practicing the processes, machines, manufactures, compositions of matter, and other teachings of the present disclosure and to enable others skilled in the art to utilize the teachings of the present disclosure in such, or other, embodiments and with the various modifications required by the particular applications or uses. Accordingly, the processes, machines, manufactures, compositions of matter, and other teachings of the present disclosure are not intended to limit the exact embodiments and examples disclosed herein. Any section headings herein are provided only for consistency with the suggestions of 37 C.F.R. §1.77 or otherwise to provide organizational queues. These headings shall not limit or characterize the invention(s) set forth herein.

What is claimed:

1. A propulsion unit for hand-pushed mobile equipment, the propulsion unit comprising:
    (a) a support platform configured to accommodate an upright rider while standing or leaning and capable of supporting the weight of said rider;
    (b) a plurality of wheels, each having a ground contact point, at least three of said wheels being load-bearing, and at least one of said wheels being a first drive wheel, wherein the ground contact points of the three load-bearing wheels define a plane;
    (c) a drive motor positioned to drive the first drive wheel; and
    (d) a connector to connect the propulsion unit to the hand-pushed mobile equipment by forming a yaw joint, wherein the joint swivels about a swivel point directly below the platform along a swivel axis, enabling the hand-pushed mobile equipment to yaw relative to the propulsion unit when connected;
        wherein the unit is caused to steer when connected to the hand-pushed mobile equipment via the joint when an uneven force is exerted on the hand-pushed mobile equipment on opposite sides of the direction of thrust.

2. The unit of claim 1, in which the plurality of wheels comprise at least three load-bearing wheels, wherein the ground contact points of the three load-bearing wheels define a plane.

3. The unit of claim 1, in which the connector forms a pitch joint, wherein the pitch joint swivels about a second swivel point forward of the platform, enabling the hand-pushed mobile equipment to pitch relative to the propulsion unit when connected.

4. The unit of claim 1, in which the connector forms a pitch joint, wherein the pitch joint swivels about a second swivel point forward of the unit, enabling the hand-pushed mobile equipment to pitch relative to the propulsion unit when connected.

5. The unit of claim 1, in which said first drive wheel is load-bearing.

6. The unit of claim 1, comprising a second drive wheel, in which the first drive wheel and the second drive wheel are load-bearing.

7. The unit of claim 1 in which one or more of the wheels that are load bearing are caster wheels.

8. The unit of claim 1, comprising four wheels, in which two of the wheels are load bearing and swivel, and in which two of the wheels are drive wheels that are load bearing and do not swivel.

9. The unit of claim 1, comprising four wheels, in which two of the wheels are load bearing and are free to roll in any direction, and in which two of the wheels are drive wheels that are load bearing and do not swivel.

10. The unit of claim 1, in which the plurality of wheels comprises four wheels in a generally rectangular or trapezoidal arrangement, two of said wheels being rear wheels and two of said wheels being front wheels, in which the front wheels are load bearing and free to roll in any direction, and in which the rear wheels are drive wheels that are load bearing and do not swivel.

11. The unit of claim 1, in which the platform has a section to accommodate the rider's feet, and in which the swivel point is directly below the section to accommodate the rider's feet.

12. The unit of claim 1, in which the yaw joint is positioned so that the swivel point is directly below the upright rider when the upright rider is on the support platform.

13. The unit of claim 1, in which the yaw joint is positioned so that the swivel axis of the yaw joint is approximately collinear with the vertical axis of the rider's body when the rider is on the support platform.

14. The unit of claim 1, in which the joint is positioned so that the vertical axis of the joint is within approximately 12" (30 cm) of the vertical axis of the rider's body when the rider is on the support platform.

15. The unit of claim 1, in which the first drive wheel is configured to maintain a plane of rotation that is essentially constant relative to the rest of the unit.

16. The unit of claim 1 wherein the hand-pushed mobile equipment serves as a steering mechanism, and wherein the unit comprises no steering mechanism in addition to the hand-pushed mobile equipment.

17. The unit of claim 1, comprising a drive section positioned adjacent to the platform, the drive section comprising an energy source providing energy to the drive motor.

18. The unit of claim 1, comprising a standing seat mounted on the platform.

19. The unit of claim 1, comprising an adaptor configured to be fastened to the lower rear crossbar of a shopping cart, and which is connected to the joint.

20. The unit of claim 1, comprising a control interface configured to be placed on the outboard end of a handle of the pushed equipment.

21. The unit of claim 1, in which the connector is of variable length.

22. The unit of claim 1, comprising a brake positioned to prevent the connector from yawing relative to the unit when activated.

23. The unit of claim 1, comprising two spring-biased bolts on the bottom of the unit, positioned to arrest the yawing of the hand-pushed equipment.

24. An assembly of a propulsion unit and a shopping cart, comprising:
    (a) the propulsion unit of claim 1;
    (b) a shopping cart comprising: (i) a handle having an inboard region and two outboard ends, and (ii) a lower rear crossbar;
    (c) an adaptor connected to the connector of the propulsion unit and reversibly fastened to the lower rear crossbar of the shopping cart; and
    (d) a control interface of the propulsion unit placed on an outboard end of the handle.

* * * * *